United States Patent [19]
Himmler et al.

[11] 3,832,905
[45] Sept. 3, 1974

[54] BEARING FOR A BALANCING MACHINE

[75] Inventors: Günther Himmler, Darmstadt;
Klaus-Peter Ohms,
Darmstadt-Eberstadt, both of
Germany

[73] Assignee: Gerb KG Hofmann, Darmstadt,
Germany

[22] Filed: Apr. 13, 1973

[21] Appl. No.: 350,966

[30] Foreign Application Priority Data
May 3, 1972 Germany.......................... 2221648

[52] U.S. Cl. .................................................. 73/472
[51] Int. Cl. ............................................ G01m 1/22
[58] Field of Search ............................ 73/471–479

[56] References Cited
UNITED STATES PATENTS
1,429,606  9/1922  Marsland ........................... 73/475 X
3,252,332  5/1966  Senger ................................ 73/471

*Primary Examiner*—James J. Gill
*Attorney, Agent, or Firm*—Cushman, Darby & Cushman

[57] ABSTRACT

A bearing structure for a force measuring machine having a frame mounting a workpiece for rotation, a set of ball bearings at each of two bearing points and a vibration transducer associated with each bearing point for detecting the force generated in a measuring direction perpendicular to the axis of rotation of the workpiece. The ball bearings at both points are mounted so as to permit no torque in the measuring direction and at one point to permit movement along the axis of rotation of the workpiece.

6 Claims, 3 Drawing Figures

BEARING FOR A BALANCING MACHINE

The invention relates to a bearing for force measuring balancing machines, of the type having a frame structure bearing against an associated housing at two points and supporting a workpiece mounted for rotation, and vibration transducers in two planes perpendicular to the rotational axis of the workpiece, each bearing point being associated with one vibration transducer, and the combined frame structure transmitting the forces of unbalance developed during rotation to the vibration transducers.

This general kind of bearing arrangement for balancing machines is known, for example, by German Pat. application No. 1,573,653 placed open to public inspection. When correcting imbalance with a machine of this type to determine the unbalance in two planes, normally it is desired to support the workpiece to be balanced under statically determinate conditions. This permits simple analogue computing and, with the aid of the physical dimensions of the workpiece, transmitting the forces of reaction in the bearings to any rotor plane disposed rectangularly to the bearing axis and parallel to the measuring axis. In order to obtain a statically determinate support, it is essential that a force present in one bearing plane not interfere with the other bearing plane.

In the German Pat. application No. 1,573,653, placed open to public inspection, the two measuring planes are disposed at right angles to each other in order to eliminate the mutual interference of the bearing points and, therefore, of the associated measuring planes. The combined frame structure is supported on balls in the bearing points, such bearing point incorporating a single ball as supporting point for the combined frame structure. In order to avoid a lateral displacement, clamping means are provided allowing slight pivotal movements. In the known arrangement in pairs of the ball-like bearing points, however, there is the dnager of jamming so that the mutual interference of the bearing points and/or the vibration transducers in the two measuring planes is not eliminated.

From the German documents Pat. No. 1,573,653, placed open for public inspection, a bearing is described which allows, on balancing machines with interconnected bearings, setting the frame according to physical dimensions. By arranging three leaf springs with the mean one pointing with its flat side in direction of the rotor axis and the other two leaf springs disposed laterally beside it with their flat sides pointing in the direction of measurement, it is not possible to obtain a statically determinate support as necessary for the simple conversion of the forces of reaction in the bearings of parallel planes, since the bearing points affect each other due to the restoring forces of the leaf springs.

It is the object of the invention to provide bearing means for force measuring balancing machines with interconnected bearings providing a statically determinate accommodation between the bearing pedestal and the combined frame structure.

With regard to balancing machine bearing means of the above-mentioned type, the task is solved according to the invention in that the bearing points of the combined frame structure are free from torque in the measuring direction of the vibration transducers and in that the combined frame structure is supported in one bearing point and is displaceably accommodated in the other bearing point in the direction of the rotational axis of the workpiece to be balanced.

The combined frame structure is carried in the bearing points in such a way that, should one of the bearing points be removed, the frame structure is arranged freely swinging in the remaining bearing point.

A support free of torque can be achieved when the frame structure is mounted in ball bearings and the rotational axes of said ball bearings are arranged perpendicularly to the measuring directions of the respective vibration transducers. For this purpose, two ball bearings can be arranged in each bearing point symmetrically to the rotational axis of the workpiece.

Furthermore, one or both of the bearing points may be so adapted that they incorporate a single ball bearing with its line of pressure being disposed perpendicularly to the rotational axis of the workpiece and its rotational axis perpendicularly to the plane formed by the line of pressure and the rotational axis.

Axial displaceability of the frame structure in one bearing point can either be achieved only by the radial play of the ball bearings or by a ball guide motion parallel to the rotational axis of the workpiece. Highly precise measuring results can be obtained when the measuring direction of the transducers is identical with the direction of support of the ball bearings and when the transducers lie in the same plane as the ball bearings with the rotational axis of the workpiece and the measuring direction of the transducers forming an angle of 90°. Moreover, the rotational axes of the ball bearings may be arranged at right angles to the rotational axis of the workpiece. By means of simple analogue computing using the physical dimensions of the workpiece, the forces of reaction in the bearings may be transmitted to any rotor plane parallel to the measuring planes.

The support of the frame structure free of torque eliminates additional forces which might affect the measurements of the vibration transducers.

Owing to the support according to the invention, the workpiece is carried in a statically determinate way and, therefore, permits easy analogue reduction of the forces of reaction in the bearings to any planes parallel to the measuring plane, and preferably to the correction plane of the workpiece. The invention makes it possible to use a simple measuring electronic circuit which is less susceptible to trouble and has a low price.

The invention is described in more detail with reference to the accompanying drawings of embodiments in which.

Figure 1:
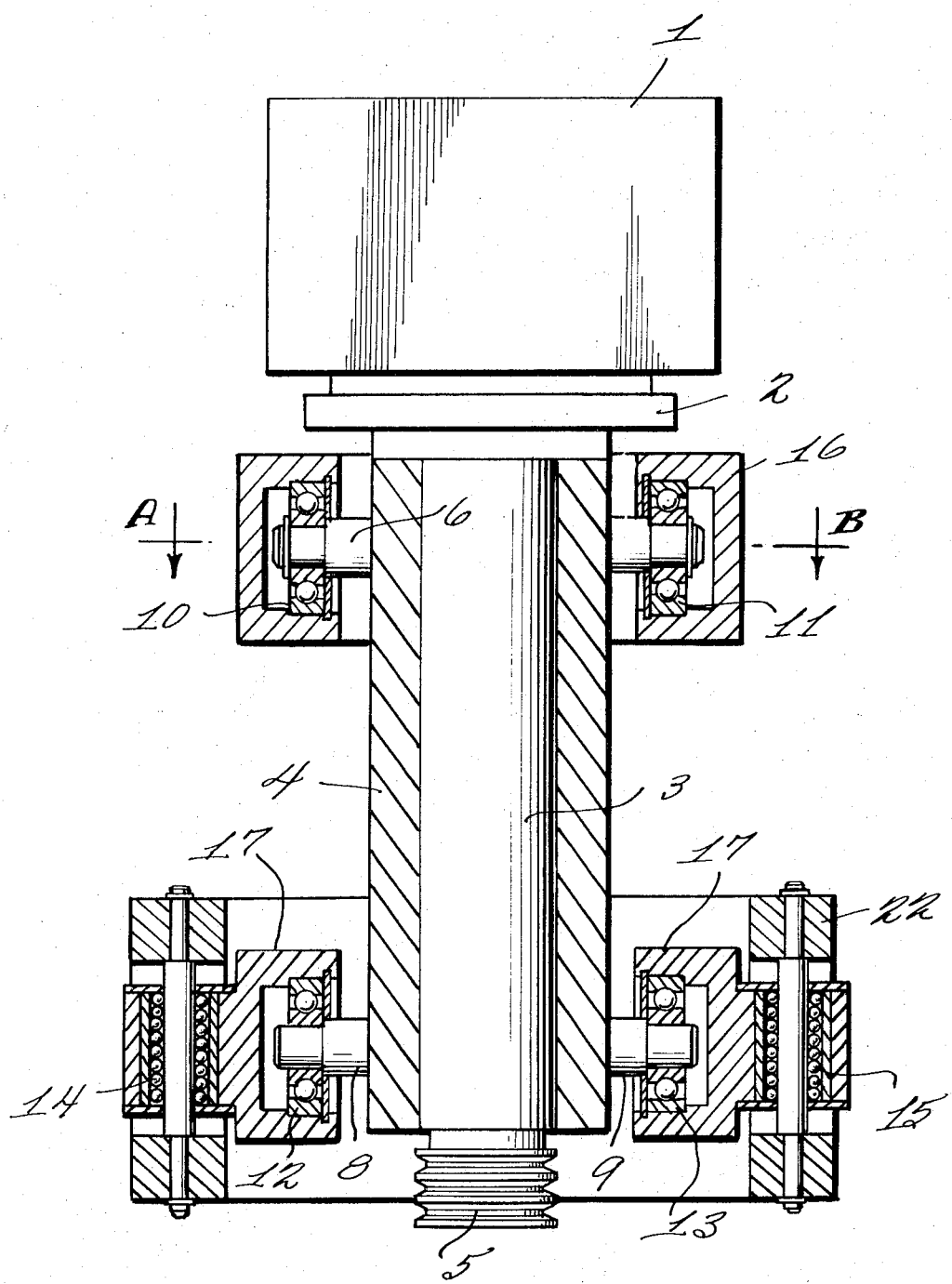
FIG. 1 represents a schematic part-sectional view of interconnected bearings for force measuring balancing machines with the machine housing and springs attaching the U-shaped brackets to the housing omitted for clarity.

FIG. 1 shows a workpiece 1 arranged on an adaptor plate 2 of a balancing machine. The adaptor plate 2 is attached to a balancing spindle 3 carried in a frame structure 4. The manner of mounting the spindle in the frame structure 4 is not illustrated in detail and may be accomplished in a known manner, for instance, by means of ball bearings. Spindle 3 is driven by a V-belt pulley 5. The frame structure 4 is supported in two planes.

For this purpose, two pairs of pins 6, 7 and 8, 9 define two bearing points. The pins in each pair are provided 180° opposed on the frame structure. Each pin defining a bearing point has at its end ball bearing 10, 11 or 12, 13. The ball bearings are secured against sliding. This arrangement of ball bearings 10–13 assures that the moments in the bearing points are zero. Axial displaceability of one bearing point according to FIG. 1 is made possible owing to ball guides 14, 15.

Figure 2:
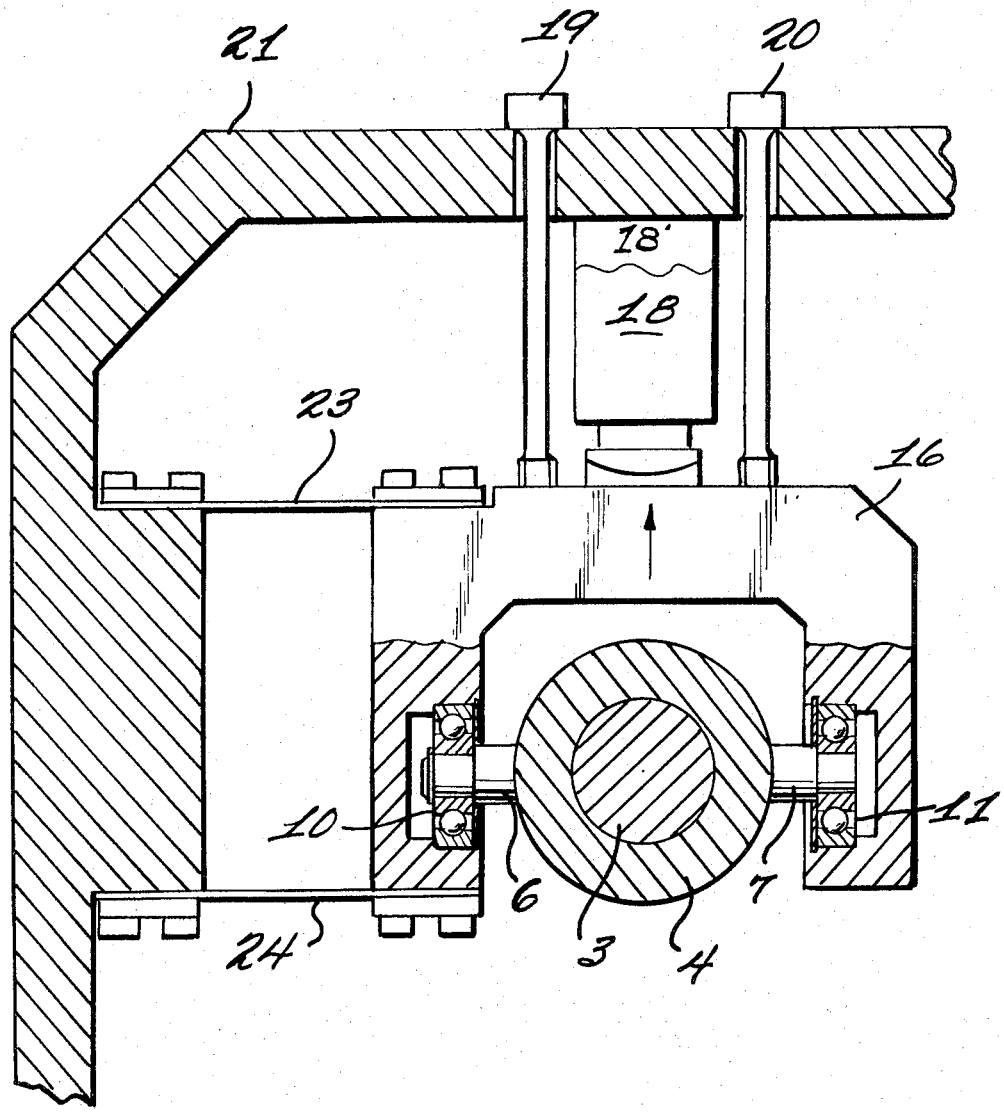
FIG. 2 represents a section along the intersecting line A-B in FIG. 1.

As will be seen in particular from FIG. 2, each bearing point comprises respectively U-shaped brackets 16 and 22. Ball bearings 10, 11 in the upper supporting plane rest in the two arms of the connecting bracket 16. The two ball bearings 12, 13 in the lower supporting plane rest in a connecting member 17, which forms the link between the ball guides 14, 15 and the ball bearings 12, 13. The ball guides 14, 15 are accommodated in the two arms of the connecting bracket 22.

Each bearing point is associated with force measuring devices in the form of vibration transducers 18 and 18', which are arranged to this end between the connecting arms of the U-shaped brackets 16, 22 and the machine housing 21. In FIG. 2, part of transducer 18 is shown broken away so transducer 18' is visible. The transducers are prestressed by means of screws 19 and 20.

Connecting brackets 16, 22 are rigidly supported through spring members 23, 24 at right angles to the measuring direction of the vibration transducers 18, indicated by an arrow in FIG. 2, to prevent the forces of reaction acting at right angles to the measuring direction of the vibration transducers 18 from being transmitted onto the vibration transducer 18.

Figure 3:
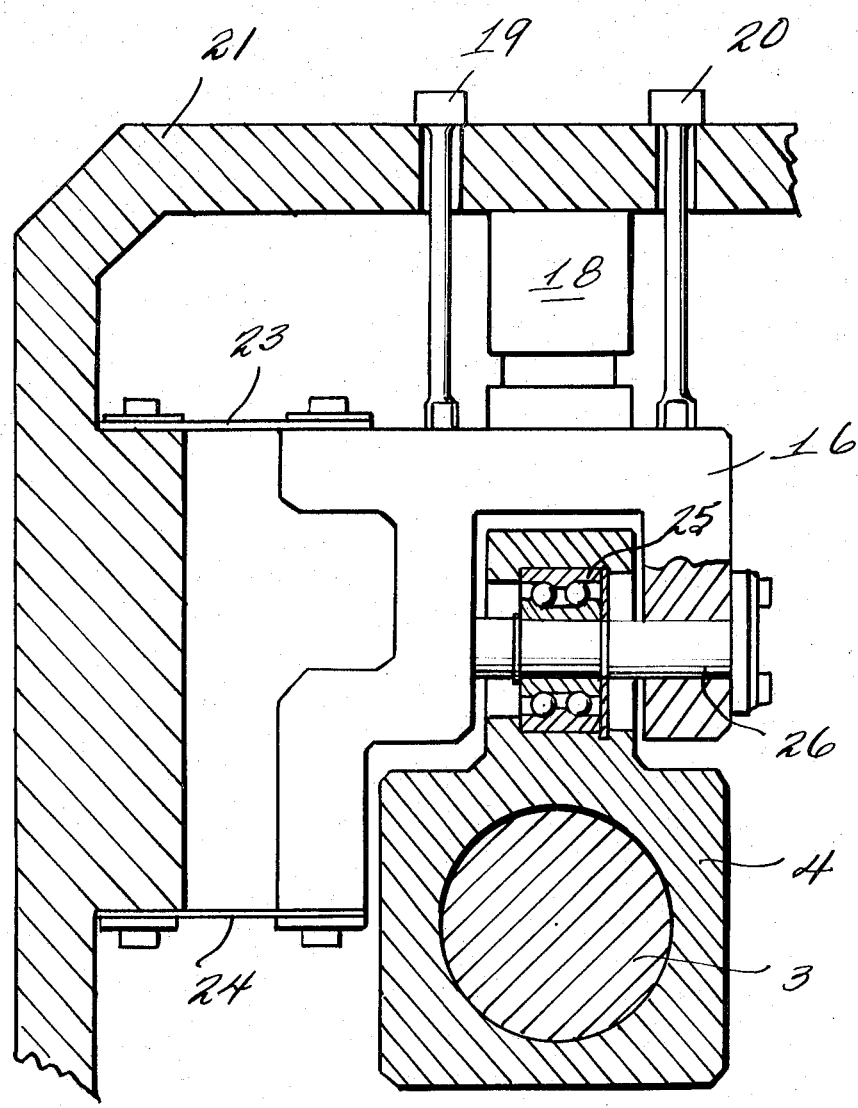
FIG. 3 represents a section through another embodiment of balancing machine bearings.

FIG. 3 shows another embodiment of the upper bearing point. This bearing point is associated with only one ball bearing 25. The line of pressure of this ball bearing 25 lies directly in the measuring direction of the vibration transducer 18, with the ball bearing 25 being disposed on the journal pin 26 extending from one free arm to the other free arm of the connecting bracket 16. While in FIGS. 1 and 2 the frame structure 4 also extends between the free arms of the connecting bracket 16, the frame structure 4 in FIG. 3 is located outside the connecting bracket 16 of the embodiment.

The vibration transducer 18 is also prestressed by means of the two screws 19 and 20 on the machine housing 21.

The flux of the unbalance forces emanating from workpiece 1 in the devices shown in both of the Figures passes via spindle 3 and frame structure 4 to ball bearings 10, 11 and 12, 13 and/or 25. Spherical mobility in the single bearing planes is assured by the journal pins 6, 7 and 8, 9 and/or 26 in conjunction with the ball bearings. The forces generated by the unbalance directly act on vibration transducer 18 through brackets 16 and 22.

What is claimed is:

1. A bearing structure for a force balancing machine comprising:

a frame for mounting a workpiece for rotation about an axis and having first and second bearing points;

first and second vibration transducers; and supporting means, mounting said frame and connected to said first and second transducers for transmitting to said first and second transducers the forces generated, during rotation in a measuring direction in a first plane perpendicular to said axis to said first transducer and in said measuring direction in a second plane also perpendicular to said axis, including force transmitting means at each of said bearing points mounted free of torque in said measuring direction with one of said force transmitting means permitting movement of said frame along said axis.

2. A structure as in claim 1 wherein each said force transmitting means includes a plurality of ball bearings each having rotational axes perpendicular to said measuring direction and means for mounting said ball bearings to transmit said forces in said measuring direction free of torque.

3. A structure as in claim 2 wherein each force transmitting means includes a pair of ball bearings symetrically disposed about said axis of said workpiece rotation.

4. A structure as in claim 2 wherein at each force transmitting means one of said ball bearings is mounted with its line of pressure perpendicular to the rotational axis of the workpiece and its rotational axis perpendicular to the plane formed by the line of pressure and that rotational axis.

5. A structure as in claim 1 wherein said one force transmitting means further includes ball guides for permitting movement of said frame along said rotational axis of said workpiece.

6. A structure as in claim 2 wherein each force transmitting means includes means for supporting at least one ball bearing in a direction parallel to said measuring direction.

* * * * *